Figure 1:
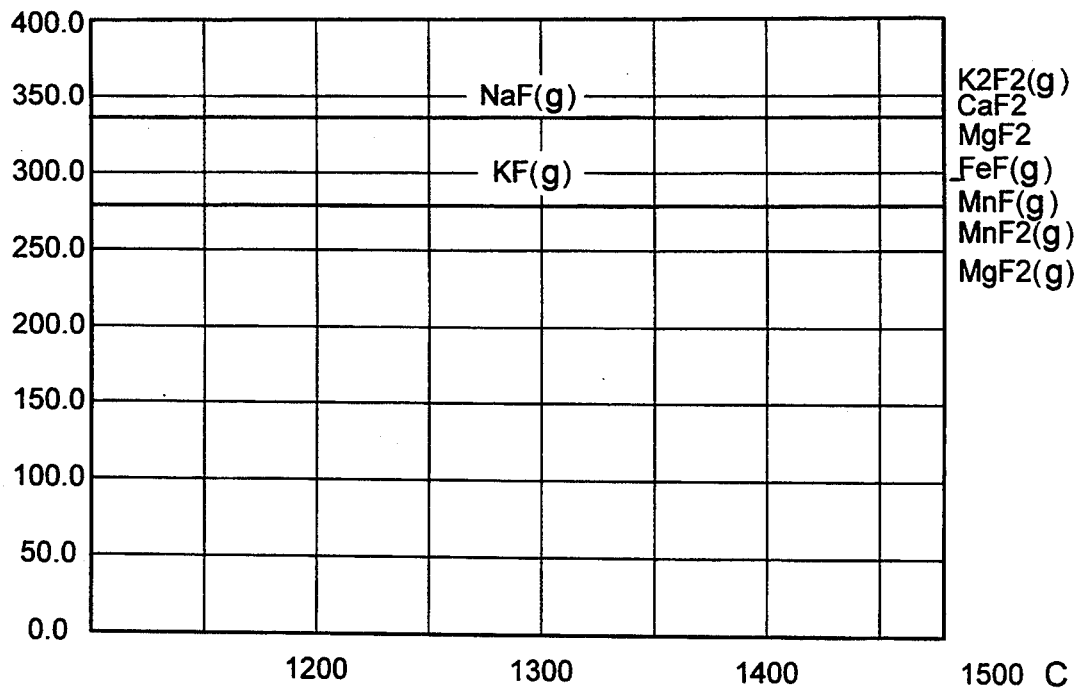

United States Patent [19]

Tuovinen et al.

[11] Patent Number: 5,411,572
[45] Date of Patent: May 2, 1995

[54] METHOD FOR UTILIZING SMELTER WASTE CONTAINING ZINC AND OTHER VALUABLE METALS

[75] Inventors: Frans H. Tuovinen; Maija-Leena Metsärinta, both of Ulvila, Finland

[73] Assignee: Outokumpu Research Oy, Pori, Finland

[21] Appl. No.: 178,123

[22] Filed: Jan. 6, 1994

[30] Foreign Application Priority Data

Jan. 26, 1993 [FI] Finland .................................. 930301

[51] Int. Cl.⁶ .............................................. C21C 5/38
[52] U.S. Cl. .......................................... 75/500; 75/549; 75/655
[58] Field of Search ........................... 75/500, 549, 655

[56] References Cited

U.S. PATENT DOCUMENTS 3,769,000 10/1973 Glassman ............................. 75/549
4,741,770  5/1988 Andrews .............................. 75/655
5,139,567  8/1992 Matsuoka ............................. 75/500

*Primary Examiner*—Peter D. Rosenberg
*Attorney, Agent, or Firm*—McAulay Fisher Nissen Goldberg & Kiel

[57] ABSTRACT

The invention relates to a method for utilizing zinciferous waste from metal smelters, such as steel smelters, so that the transmission of fluorides to the highly zinciferous secondary dusts is prevented during the treatment of the gas obtained from the waste smelting furnace. Fluorides are extremely harmful for the zinc process, and therefore it is important to prevent them from entering the process. By adjusting, according to the invention, the temperature and composition of the exhaust gases created in the smelting treatment of zinciferous dusts and other waste, the fluorides and the highly zinciferous fraction are obtained in different end products. Other valuable metals are recovered from the metal layer created on the bottom of the furnace.

14 Claims, 4 Drawing Sheets

METHOD FOR UTILIZING SMELTER WASTE CONTAINING ZINC AND OTHER VALUABLE METALS

The invention relates to a method for utilizing zinciferous waste from smelters, such as steel smelters, so that the transmission of fluorides to the highly zinciferous secondary dust is prevented while the gas from the waste smelting furnace is being treated. Fluorides are extremely harmful for the zinc process, wherefore it is important to prevent them from entering the process. By adjusting, according to the invention, the temperature and composition of the exhaust gases created in the smelting treatment of zinciferous dusts and other waste, the fluorides and the highly zinciferous fraction are recovered into different end products. Other valuable metals are recovered from the metal layer created on the bottom of the furnace.

In the production of steel, there are created unwanted side products such as gas scrubbing dusts, shot blasting dusts and various precipitates. Similar types of waste are created in other metal smelters, too. The recirculation of dusts is not economically profitable, and therefore the dusts must be stored. However, storing presents problems because typically this waste contains for instance zinc, lead and hexavalent chromium. Nowadays this type of waste is classified as hazardous waste. Among others the EC legislation sets restrictions to such waste and its transportation from one country to another. In order to make the waste fit for storing, the metals contained therein must be recovered as fully as possible, and the waste must be rendered into an inert form.

In known methods, the dusts and precipitates are fed into a furnace for smelting. Generally the employed furnace is an electric furnace, in some cases a kiln furnace, provided with plasma burners. In addition to the dusts and precipitates, into the furnace there is fed some reductible agent such as coke, as well as some flux such as quartz. From the furnace there is generally obtained an inert slag, which is mainly siliceous, as well as a metal, where the major part of the iron, chromium, nickel and molybdenum contained in the materials to be fed is recovered. If the precipitates to be treated are created for instance along with the nickel process, the metal created on the bottom of the melting furnace is mainly formed of iron, nickel, cobalt and copper. In case of the dusts and waste of so-called black iron, it is not necessary to create a metal, because the content of harmful metals in such waste is low.

Among metals, zinc and lead are discharged from the furnace in gaseous form. If the quantity of zinc and lead is remarkable in the feed, these metals are often recovered in a lead condenser. If, on the other hand, the quantity of these metals is relatively low, the metals are recovered in connection with gas scrubbing. Gas scrubbing may consist of only dry scrubbing, in which case it is carried out for instance by means of an electric filter and a bag filter, or gas scrubbing may include both dry and wet scrubbing. Usually process descriptions do not contain any remarks as for the behaviour of fluorides.

In a known method (ScanDust) the dusts from a steel plant are fed together with coal powder, sand or lime into a kiln furnace provided with plasma burners. The feed mixture is injected into the bottom part of the furnace, where the burners also are located. Coke is fed from the top part of the furnace. A molten metal and slag layer is created in the furnace. In the metal, there is recovered over 95% of the nickel and over 90% of the chromium and molybdenium. The created slag is glass-like and inert, and consequently fit for storing. The gases are removed from the furnace at the temperature of about 1,050°–1,150° C., and if the amount of zinc and lead is not very high, a lead condenser is not used, but the gases are conducted to a venturi scrubber immediately from the furnace. Naturally by using a condenser there is obtained a zinc fraction clear of fluorides, but the use of the condenser is fairly complicated. When the condenser is not in use, the zinciferous precipitate is sedimented from the scrubbing water of the scrubber, and the fluorides are recovered from the scrubbing water itself. In practice about one third of the fluorides contained in the feed goes to the slag, one third to the precipitate rich in, and one third is recovered from the scrubbing water of the wet scrubber by separate sedimentation. It is apparent that the temperature of the gases discharged from the furnace is not sufficiently high for separating the zinc and the fluorides in gas scrubbing.

According to the present invention, there is now developed a method for treating dusts and precipitates from metal smelters, in which method zinc is recovered essentially free of fluorides both from only slightly zinciferous and from highly zinciferous wastes, without recovering the zinc by means of a separate lead condenser or other condensing apparatus. The created zinciferous precipitate can be used in normal fashion in zinc plant processes without the troublesome removal of fluorides. It is essential for the now developed method that the temperature, oxidation and composition of the zinciferous gases discharged from the waste smelting furnace are adjusted, so that the zinc compound and the fluorides are recovered in separate fractions. If the waste to be treated contains lead, it follows zinc in the process. The essential novel features of the invention are apparent from the appended patent claims.

In the method of the present invention for recovering dusts and waste from a metal smelter, the smelting takes place in a conventional fashion, i.e. in an electric furnace. The employed flux is finely divided quartz or alkali silicate. In the furnace the metals of the material to be fed into the process are reduced by means of finely divided coke to a metal mixture such as FeNiCrMo, which can be recirculated back into the smelter. If the waste comes for instance from a nickel process, the metal created on the furnace bottom is of the type FeNiCoCu. If the dusts and precipitates contain only small amounts of metals, the process can be run with an oxidizing rate so high that there is created only slag but no metal phase. The created slag is inert and thus fit for storing. The gases discharged from the furnace are first scrubbed in a dry scrubber, where the major part of the mechanical dusts is recovered, and thereafter in a wet scrubber.

When searching the method for recovering dusts and waste, it was found that the temperature of gases discharged from an electric furnace to a dry scrubber, such as a hot cyclone, must be adjusted to be such that both the metallic zinc and the fluorides pass through the scrubber in gaseous form. When the dusts and precipitates from a steel plant, for instance, are being treated, the temperature of the gas fed into the dry scrubber must be at least 1,220° C. After the hot cyclone, the oxidation of the gases is adjusted so that the gaseous zinc is bound as a solid zinc compound. One solution is to feed air to the gases, so that the metallic zinc is oxidized into zinc oxide, which in these temperatures is condensed as a fine powder.

The temperature of the gases fed into the wet scrubber must be adjusted to be such that the zinc compounds are in solid form, but the fluorides remain as gaseous, water-soluble compounds. As a result of the gas scrubbing, a zinc compound is recovered as the precipitate of the scrubbing liquid of the scrubber, whereas the fluorides are dissolved into the scrubbing liquid itself and do not go into the precipitate.

When referring to fluorides in the above description of the method of the present invention, we have meant water-soluble fluorides such as NaF, KF and hydrogen fluoride HF. However, the furnace feed may include dust and precipitates containing slightly soluble fluorine compounds. When a gas contains for instance calcium fluoride, it must be rendered into soluble form prior to the gas scrubbing, because $CaF_2$ would not dissolve into the scrubbing water of the scrubber, but would go into the zinciferous precipitate. If the furnace feed contains slightly soluble fluoride, into the gases discharged from the furnace there is fed finely divided silicon oxide or alkali silicate, which reacts with the fluoride resulting as a corresponding silicate, which then is recovered as dust in the hot cyclone. Thus for example $CaF_2$ reacts with silicon oxide, forming calcium silicate. The fluorine in the compound is bound as hydrogen fluoride or other soluble fluorides, such as KF or NaF, and is recovered in the wet scrubber. Alkali silicate does not necessarily have to be fed into gases, but its use as a flux in the melting process itself leads to the decomposition of slightly soluble fluorides which was described above.

The pH of the solution of the wet scrubber is adjusted within the range 6–7, where zinc is not dissolved and the scrubbing conditions are ideal in other respects, too. From the bottom part of the scrubber the scrubbing liquid i.e. the circulation solution is conducted into scrubbing circulation. First the solution is conducted into settling. The resulting underflow is fed to a filter, wherefrom a zinciferous precipitate is obtained; this precipitate can be further conducted to the zinc process. The overflow from the settling, as well as the filter solution, are conducted to precipitation, where the fluorides are precipitated for instance by means of calcium chloride or calcium hydroxide. The cleaned solution is conducted, via a heat exchanger, back to scrubbing.

In addition to volatilized metals and fluorides, the gases discharged from the furnace also contain large quantities of carbon monoxide CO. The scrubbed CO is employed for producing energy after the gas scrubbing steps. Because CO can be used as a fuel, the oxidation of zinc that takes place in between the hot separation device and the gas scrubber is carried out with a quantity of air which is optimized to be minimal, in order to avoid a simultaneous oxidation of carbon monoxide into carbon dioxide—which would decrease the amount of energy to be produced. On the other hand, the temperature can at this stage be raised by burning carbon monoxide, if it should be necessary. In some conditions gas does not require a separate addition of air, but the zinc already is in an oxidized state or in another solid state at the said temperature.

In the above specification it was described that the gas discharged from the hot cyclone is oxidized so, that the metallic zinc existing in gaseous form is condensed as zinc oxide. However, gas can also be reduced, by means of some sulphur-bearing agent, so that the zinc is reduced into zinc sulphide, which also is solid at the said temperature. In practice the oxidation of gas tends to be the easiest procedure to perform.

Figure 2:
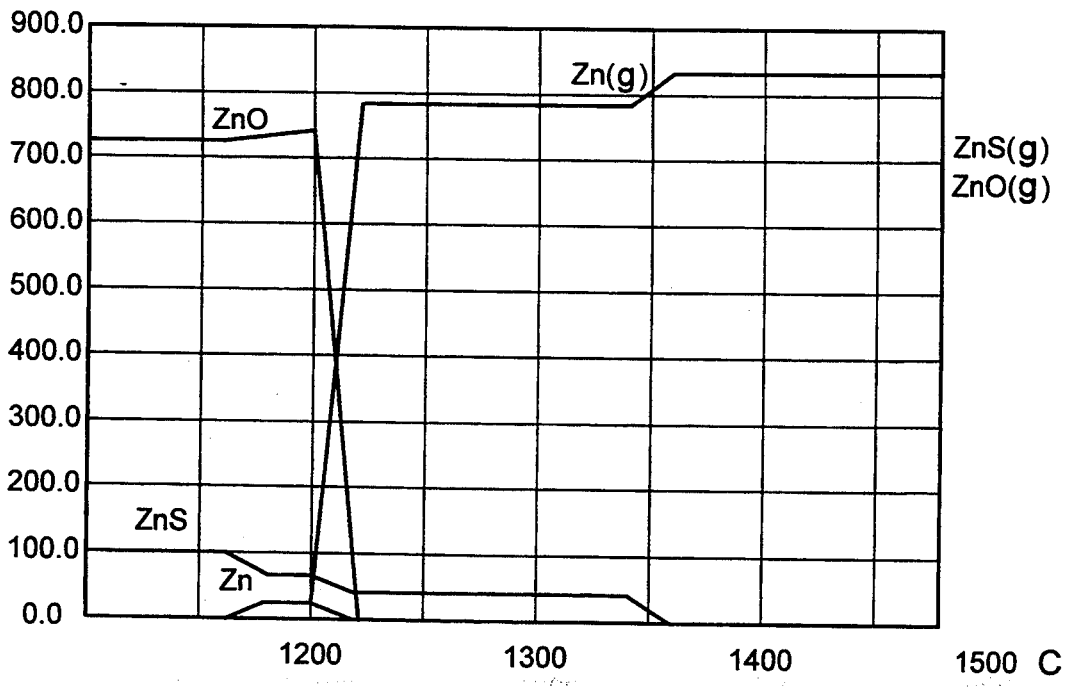
Figure 3:
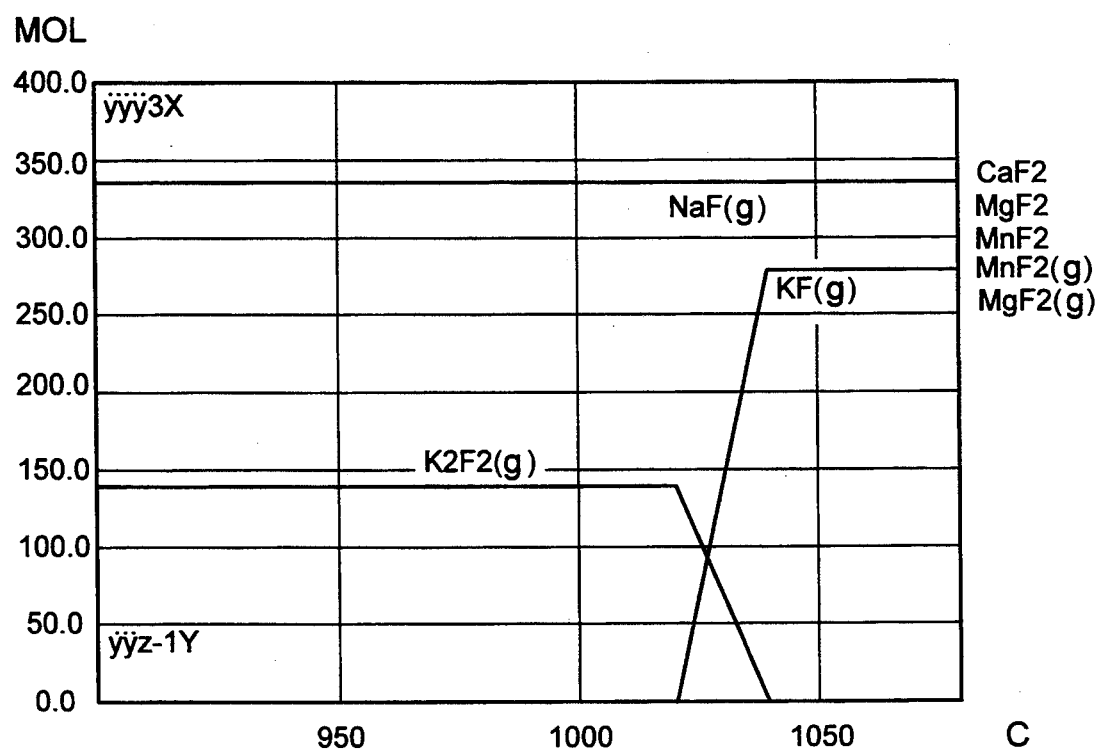
Figure 4:
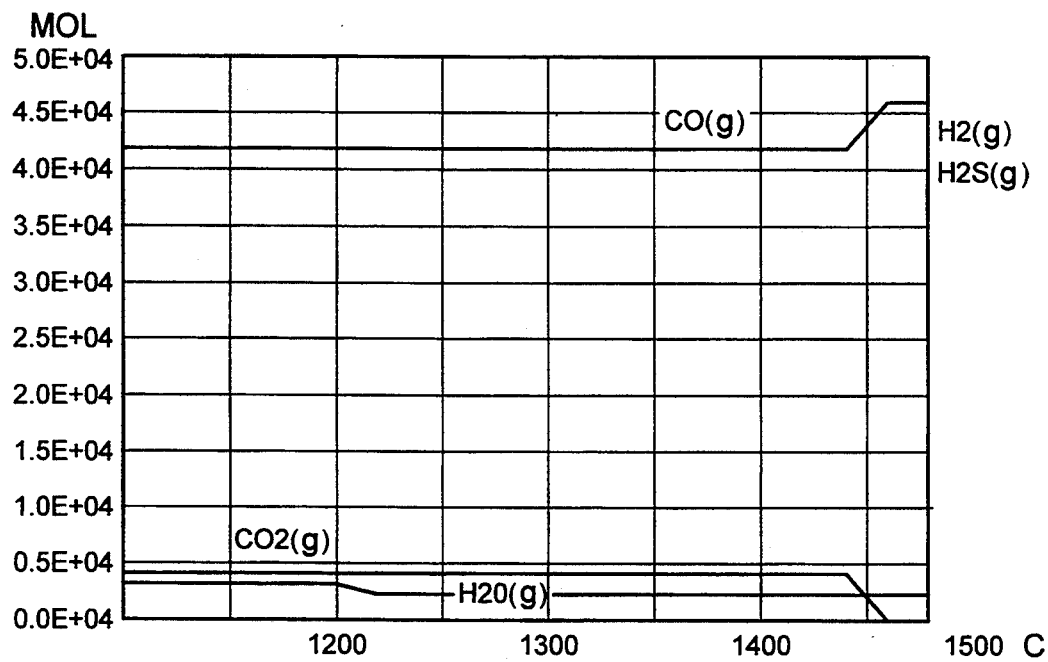
Figure 5:
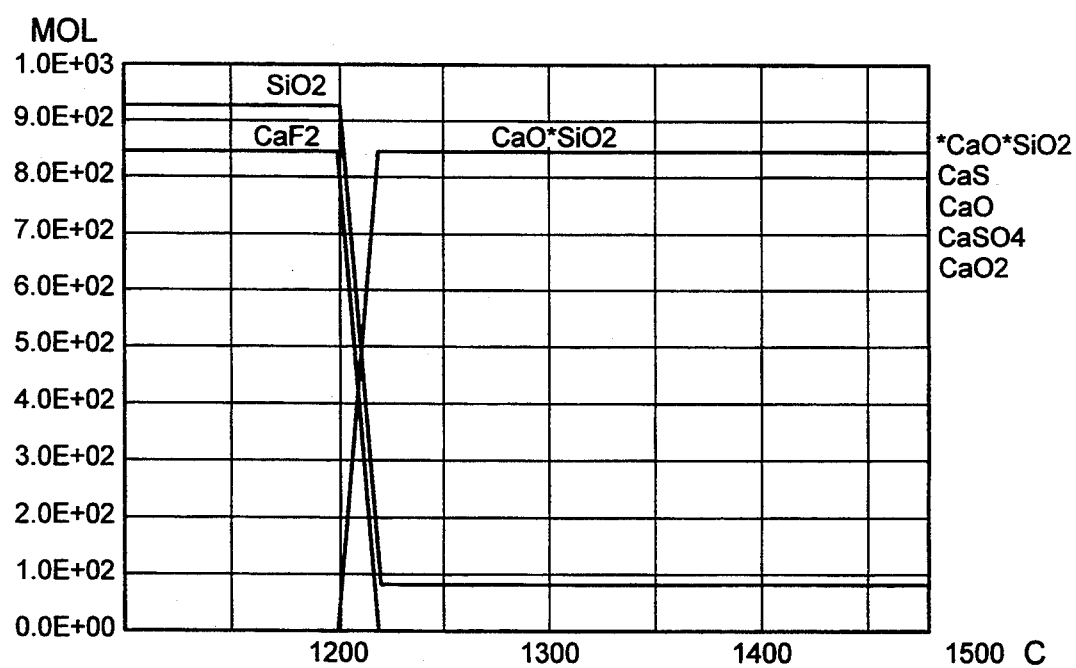
Figure 6:
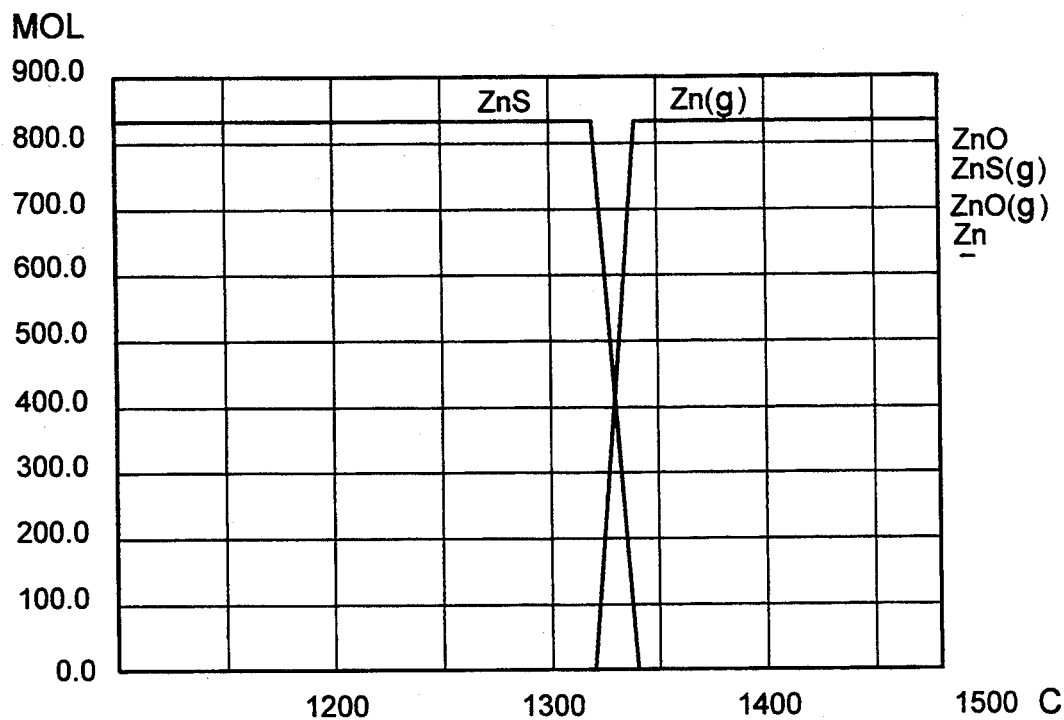
Figure 7:
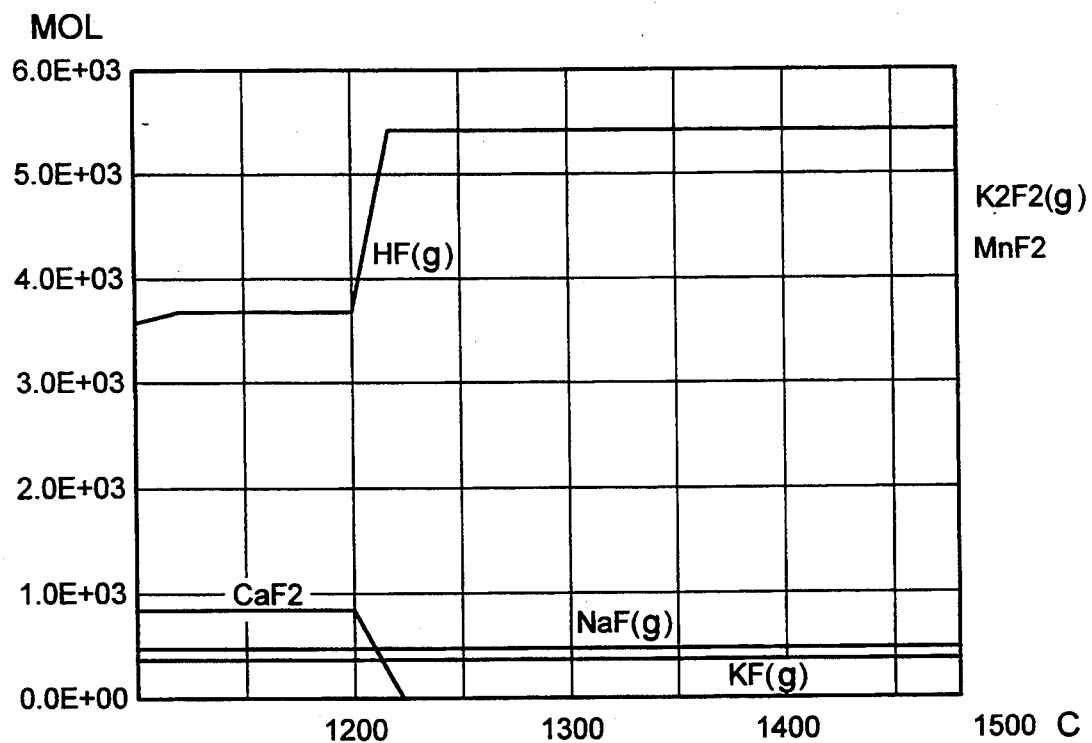

The invention is further illustrated with reference to the appended examples. The examples are also provided with the gas-dust balance curves; the curves in FIGS. 1, 2 and 3 illustrate the situation of example 1, and the curves in FIGS. 4, 5, 6 and 7 illustrate the situation of example 2.

EXAMPLE 1

Steel dust and shot blasting dust are smelted in an electric furnace by using fine coke as the reductant and quartz as the flux. The obtained product is metal, slag, mechanical dust, zinciferous precipitate and calcium fluoride bearing precipitate. For injecting the feed mixture, there is used 120 $Nm^3/h$ nitrogen, in addition to which leakage air enters the furnace at 100 $Nm^3/h$. The melting takes place at 1,550° C., and the required energy is 3,160 kWh. The temperature of the gases fed into the mechanical dust separation must in this case be at least 1,220° C. The dusts are recirculated back into the furnace. After dust 1 separation, 64 $Nm^3/h$ air is fed into the gases in order to oxidize the metallic zinc into zinc oxide. The temperature of the gas entering the scrubber must be below 1,220° C., but over 1,060° C., in order to keep the fluorides in gaseous form prior to the scrubber.

| Feeds: | |
|---|---|
| steel dust 1,625 kg/h | |
| $Cr_2O_3$ % | 19 |
| $Fe_2O_3$ % | 44 |
| $SiO_2$ % | 5 |
| NiO % | 3 |
| MnO % | 4 |
| $MoO_3$ % | 0.5 |
| ZnO % | 5 |
| PbO % | 1 |
| $CaF_2$ % | 3 |
| $Na_2O$ % | 1 |
| $K_2O$ % | 1 |
| shot blasting dust 250 kg/h | |
| $Cr_2O_3$ % | 21 |
| FeO % | 69 |
| NiO % | 9 |
| MnO % | 1.3 |
| $MoO_3$ % | 0.7 |
| coke 440 kg/h | |
| $C_{fix}$ % | 84.3 |
| Ashes % | 14 |
| quartz 72 kg/h | |
| $SiO_2$ % | |
| Products: | |
| metal 986 kg/h | |
| Cr % | 22.7 |
| Fe % | 62.8 |
| Si % | 1.7 |
| Ni % | 5.5 |
| Mn % | 2.7 |
| Mo % | 0.6 |
| C % | 4.0 |
| S % | 0.1 |
| slag 412 kg/h | |
| $Cr_2O_3$ % | 7.6 |
| FeO % | 4.2 |
| $SiO_2$ % | 30.5 |
| NiO % | 0.5 |
| MnO % | 5.6 |
| CaO % | 32.8 |
| MgO % | 8.0 |
| $Al_2O_3$ % | 3.6 |
| $MoO_3$ % | 0.3 |
| $Na_2O$ % | 0.6 |

-continued

| | |
|---|---|
| K₂O % | 0.3 |
| CaF₂ | 4.8 |
| S % | 0.3 |
| C % | 0.8 |
| mechanical dust 57 kg/h | |
| CaO*SiO₂ % | 23.08 |
| Cr₂O₃ % | 20.08 |
| MnO % | 16.93 |
| 2CaO*SiO₂ % | 16.07 |
| FeO % | 11.09 |
| MgO % | 5.54 |
| CaS % | 2.19 |
| Na₂O % | 1.84 |
| ZnS % | 1.21 |
| Al₂O₃ % | 1.20 |
| zinc precipitate 101 kg/h | |
| ZnO % | 73 |
| ZnS % | 6.4 |
| PbS % | 10.8 |
| CaO*SiO₂ % | 2.3 |
| Cr₂O₃ % | 2.0 |
| MnO % | 1.7 |
| 2CaO*SiO₂ % | 1.6 |
| FeO % | 1.1 |
| MgO % | 0.5 |
| CaS % | 0.2 |
| Na₂O % | 0.1 |
| Al₂O₃ % | 0.1 |
| filter precipitate 45 kg/h | |
| CaF₂ % | 60 |
| gases discharged from the scrubber 948 Nm³/h | |
| CO % | 61 |
| N₂ % | 27.8 |
| CO₂ % | 2.7 |
| H₂O % | 7.0 |

EXAMPLE 2

Steel dust, shot blasting dust, neutralizing precipitate, metal scales and sulphate precipitate are smelted in an electric furnace by employing fine coke as reductant and quartz as flux. The obtained product is metal, slag, mechanical dust, zinciferous slag and calcium fluoride bearing slag. For injecting the feed mixture, there is used 120 Nm³/h nitrogen, in addition to which leakage air enters the furnace at 100 Nm³/h. The smelting takes place at 1,550° C., the required energy is 6,077 kWh. Prior to the mechanical dust separation, 50 kg/h finely divided silicon oxide is fed into the gas. The temperature of the gases fed into the mechanical dust separation must in this case be at least 1,360° C. The temperature of the gas entering the scrubber must be below 1,320° C., but over 1,220° C.

| | |
|---|---|
| Feeds: | |
| steel dust 1,460 kg/h | |
| Cr₂O₃ % | 19 |
| Fe₂O₃ % | 44 |
| SiO₂ % | 5 |
| NiO % | 3 |
| MnO % | 4 |
| MoO₃ % | 0.5 |
| ZnO % | 5 |
| PbO % | 1 |
| CaF₂ % | 3 |
| Na₂O % | 1 |
| K₂O % | 1 |
| shot blasting dust 250 kg/h | |
| Cr₂O₃ % | 21 |
| FeO % | 69 |
| NiO % | 9 |
| MnO % | 1.3 |
| MoO₃ % | 0.7 |
| neutralizing precipitate 875 kg/h | |
| Cr₂O₃ % | 5 |
| Fe₂O₃ % | 15 |
| NiO % | 2.1 |
| MoO₃ % | 0.14 |
| CaF₂ % | 24.9 |
| Na₂O % | 0.2 |
| SO₃ % | 21.1 |
| Crystal water/% of moisture | 43 |
| sulphate precipitate 375 kg/h | |
| Cr₂O₃ % | 2.6 |
| FeO % | 14.8 |
| NiO % | 2.8 |
| MoO₃ % | 0.12 |
| CaF₂ % | 0.45 |
| Na₂O % | 0.11 |
| K₂O % | 0.12 |
| metal scales 165 kg/h | |
| Cr₂O₃ % | 11.3 |
| Fe₂O₃ % | 66 |
| SiO₂ % | 12 |
| NiO % | 5 |
| MnO % | 1 |
| MoO₃ % | 0.1 |
| Na₂O % | 0.3 |
| K₂O % | 0.1 |
| coke 440 kg/h | |
| C$_{fix}$ % | 84.3 |
| Ashes % | 14 |
| quartz 72 kg/h | |
| SiO₂ % | |
| Products: | |
| metal 1,247 kg/h | |
| Cr % | 20.2 |
| Fe % | 64.3 |
| Si % | 3.5 |
| Ni % | 6.5 |
| Mn % | 2.0 |
| Mo % | 0.5 |
| C % | 3.0 |
| S % | 0.1 |
| slag 1,030 kg/h | |
| Cr₂O₃ % | 4.3 |
| FeO % | 2.5 |
| SiO₂ % | 35.5 |
| NiO % | 0.3 |
| MnO % | 2.1 |
| CaO % | 39.5 |
| MgO % | 4.0 |
| Al₂O₃ % | 3.2 |
| MoO₃ % | 0.2 |
| Na₂O % | 0.3 |
| K₂O % | 0.1 |
| CaF₂ % | 5.7 |
| S % | 2.0 |
| C % | 0.3 |
| mechanical dust 100 kg/h | |
| CaF₂ % | 0.13 |
| CaO*SiO₂ % | 79.92 |
| Cr₂O₃ % | 9.32 |
| MnO % | 8.89 |
| 2CaO*SiO₂ % | 0.03 |
| FeO % | 5.42 |
| MgO % | 1.85 |
| Al₂O₃ % | 1.44 |
| zinc precipitate 114 kg/h | |
| ZnS % | 76 |
| PbS % | 8.3 |
| CaF₂ % | 0.02 |
| CaO*SiO₂ % | 11.3 |
| Cr₂O₃ % | 1.4 |
| MnO % | 1.4 |
| FeO % | 0.8 |
| MgO % | 0.3 |
| Al₂O₃ % | 0.2 |
| fluorine precipitate 1,134 kg/h | |
| CaF₂ % | 18 |
| CaSO₄ % | 45 |
| CaO % | 20 |
| Others % | 17 |

| gases discharged from the scrubber 1,363 Nm³/h | |
|---|---|
| CO % | 71 |
| N₂ % | 14 |
| CO₂ % | 7 |
| H₂O % | 7.5 |

We claim:

1. A method for utilizing smelter waste containing zinc, other valuable metals and fluorides so that waste created from dusts and precipitates is reducibly melted in an electric furnace together with flux and a coal containing material, and obtaining a molten metal mixture containing at least an inert slag or an inert slag and valuable metals, comprising:
   conducting a carbon monoxide bearing gas containing volatilized metals and fluorides to a dry and wet scrubber;
   adjusting the temperature of the dry scrubber for maintaining therein the zinc and fluoride in gaseous form, and removing the major part of mechanical dust contained in the gases;
   adjusting oxygen content of the scrubbed gases to be within a range such that the zinc content in the gases forms a solid zinc component;
   adjusting the temperature of the gases fed to the wet scrubber to be within a range such that any zinc compound is in solid form, and the fluorides remain gaseous; and
   recovering the slag and any zinc compound into a precipitate of the scrubbing liquid of the wet scrubber, and dissolving the water-soluble gaseous fluoride compounds in the scrubbing liquid of the wet scrubber.

2. The method according to claim 1, including oxidizing the gases obtained from the dry scrubber to recover zinc as zinc oxide.

3. The method according to claim 1, including reducing the gases obtained from the dry scrubber with a sulphur-bearing material in order to recover zinc as zinc sulphide.

4. The method according to claim 1, including conducting finely divided silicon oxide into the gases fed into the dry scrubber in order to decompose the slightly soluble fluoride contained in the gas into a solid insoluble silicate and a soluble gaseous fluorine compound, and recovering the silicate from the dusts of the dry scrubber and the hydrogen fluoride from the scrubbing liquid of the wet scrubber.

5. The method according to claim 1, including conducting finely divided alkali silicate into the gases fed into the dry scrubber in order to decompose the slightly soluble fluoride contained in the gas into solid insoluble silicate and a soluble gaseous fluorine compound, and recovering the silicate from the dusts of the dry scrubber and the hydrogen fluoride from the scrubbing liquid of the wet scrubber.

6. The method according to claim 4, wherein the slightly soluble fluoride is calcium fluoride and the insoluble silicate is calcium silicate.

7. The method according to claim 5, wherein the slightly soluble fluoride is calcium fluoride and the insoluble silicate is calcium silicate.

8. The method according to claim 1, including forming the valuable metals contained in the waste in the furnace made into a metal mixture containing mainly iron, nickel and chromium.

9. The method according to claim 1, including forming the valuable metals contained in the waste in the furnace into a metal mixture containing mainly iron, nickel, cobalt and copper.

10. The method according to claim 1, wherein when utilizing the waste obtained from the steel process, the temperature of the gas fed into the dry scrubber is at least 1220° C.

11. The method according to claim 1, including adjusting the pH of the wet scrubber solution to be within the range of 6–7.

12. A method for treating dusts and precipitates from metal smelters to recover zinc essentially free of fluorides from zinciferous wastes, comprising:
    dry scrubbing gases discharged from a furnace for recovering the major part of mechanical dusts and adjusting the temperature of oxidization of the gases so that gaseous zinc is bound as solid zinc; and
    wet scrubbing the gases after the dry scrubbing at a temperature of the gases adjusted so that the zinc compounds are in a solid form and the fluorides remain gaseous, water-soluble compounds for recovering a zinc compound as the precipitates from the scrubbing liquid of the wet scrubber and the fluorides dissolved in the scrubbing liquid.

13. A method for treating dusts and precipitates from metal smelters wherein the precipitates contain only a small amount of metals to create a slag without a metal phase, comprising:
    dry scrubbing gases discharged from a furnace for recovering the major part of the mechanical dusts and gases with an oxidizing rate sufficiently high so that only slag is created, but no metal phase;
    wet scrubbing after the dry scrubbing so that the fluorides remain as gaseous, water-soluble compounds for recovering of the slag compound as precipitates from the scrubbing liquid of the wet scrubber and the fluorides dissolved in the scrubbing liquid; and
    oxidizing the dusts and precipitates at a high oxidizing rate to produce only the slag, without the metal phase.

14. The method according to claim 13, wherein when utilizing the waste obtained from the steel process, the temperature of the gas fed into dry scrubber is at least 1220° C.

* * * * *